United States Patent
Finkelstein et al.

(10) Patent No.: US 9,735,895 B2
(45) Date of Patent: Aug. 15, 2017

(54) REDUCING SIGNAL IMPAIRMENTS IN COMMUNICATION NETWORKS VIA SELECTIVE FILTERING TECHNIQUES

(71) Applicant: COX COMMUNICATIONS, INC., Atlanta, GA (US)

(72) Inventors: Jeffrey L. Finkelstein, Atlanta, GA (US); John Civiletto, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 14/993,224

(22) Filed: Jan. 12, 2016

(65) Prior Publication Data

US 2017/0201332 A1    Jul. 13, 2017

(51) Int. Cl.
*H04B 3/00* (2006.01)
*H04L 25/00* (2006.01)
*H04B 15/02* (2006.01)
*H04L 12/26* (2006.01)
*H04B 3/60* (2006.01)

(52) U.S. Cl.
CPC .............. *H04B 15/02* (2013.01); *H04B 3/60* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 2006/0146986 A1* | 7/2006 | Bentley | H04L 27/2601 379/9.06 |
| 2012/0106606 A1* | 5/2012 | Samy | H04B 3/28 375/222 |
| 2012/0134397 A1* | 5/2012 | Cioffi | H04L 12/2856 375/222 |
| 2015/0097722 A1* | 4/2015 | Sin | G01S 19/38 342/357.21 |

* cited by examiner

*Primary Examiner* — Shuwang Liu
*Assistant Examiner* — Gina McKie
(74) *Attorney, Agent, or Firm* — Eversheds Sutherland (US) LLP

(57) ABSTRACT

Certain embodiments herein relate to reducing impairments in signals transmitted over a service provider network. A selective filtering device may be placed at various locations in the service provider network to reduce the noise. For example, the devices may be located in, coupled to, or otherwise associated with a tap, an optical node, an amplifier, or other location in the service provider network that may be upstream from user devices at customer premises locations. The selective filtering device may be selective in the way that it may use various types of filtering techniques to eliminate or reduce the noise in a signal. Such techniques may be based on the power densities of carriers and noise in the signal, as well as information associated with scheduled communications in the service provider network.

16 Claims, 5 Drawing Sheets

REDUCING SIGNAL IMPAIRMENTS IN COMMUNICATION NETWORKS VIA SELECTIVE FILTERING TECHNIQUES

BACKGROUND

Upstream communications in communication networks, such as cable networks, may be hindered by noise or other unwanted signals. Existing techniques for separating noise from a desired signal may struggle to identify a desired signal, particularly at locations relatively upstream in the network where information associated with multiple customer premises may be aggregated.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, reducing impairments in signals transmitted over a service provider network. Impairments may include noise or unwanted signals that may interfere with information transmitted over a service provider network, such as a cable network or other network. Signals transmitted over the service provider network may include carriers, which may include valid information, and noise. A selective filtering device may be placed at various locations in the service provider network to reduce the noise. For example, such devices may be located in, coupled to, or otherwise associated with a tap, an optical node, an amplifier, or other location in the service provider network that may be upstream from user devices at customer premises locations. By virtue of being located upstream of such user devices, a selective filtering device herein may receive signals in which information and noise have been accumulated or aggregated from multiple customer premises associated with the selective filtering device. Existing techniques may struggle to discern valid carriers from noise in the presence of such accumulation.

A selective filtering device herein may be selective in the way that it may use various types of filtering techniques to eliminate or reduce the noise in a signal. An example technique may include identifying carriers in a signal by comparing power densities of the carriers to a threshold value, which may be predetermined using historical information or established by a user. Another example technique may include identifying carriers at predetermined frequencies in a signal, which may also be determined based on historical information. Yet another example technique may include demodulating a signal to remove noise from the signal using information in Media Access Control (MAC) management messages, which may indicate a time and a frequency at which user devices at customer premise locations are scheduled to transmit information in the service provider network. Each of these techniques, among others, are described in greater detail below.

Figure 1:
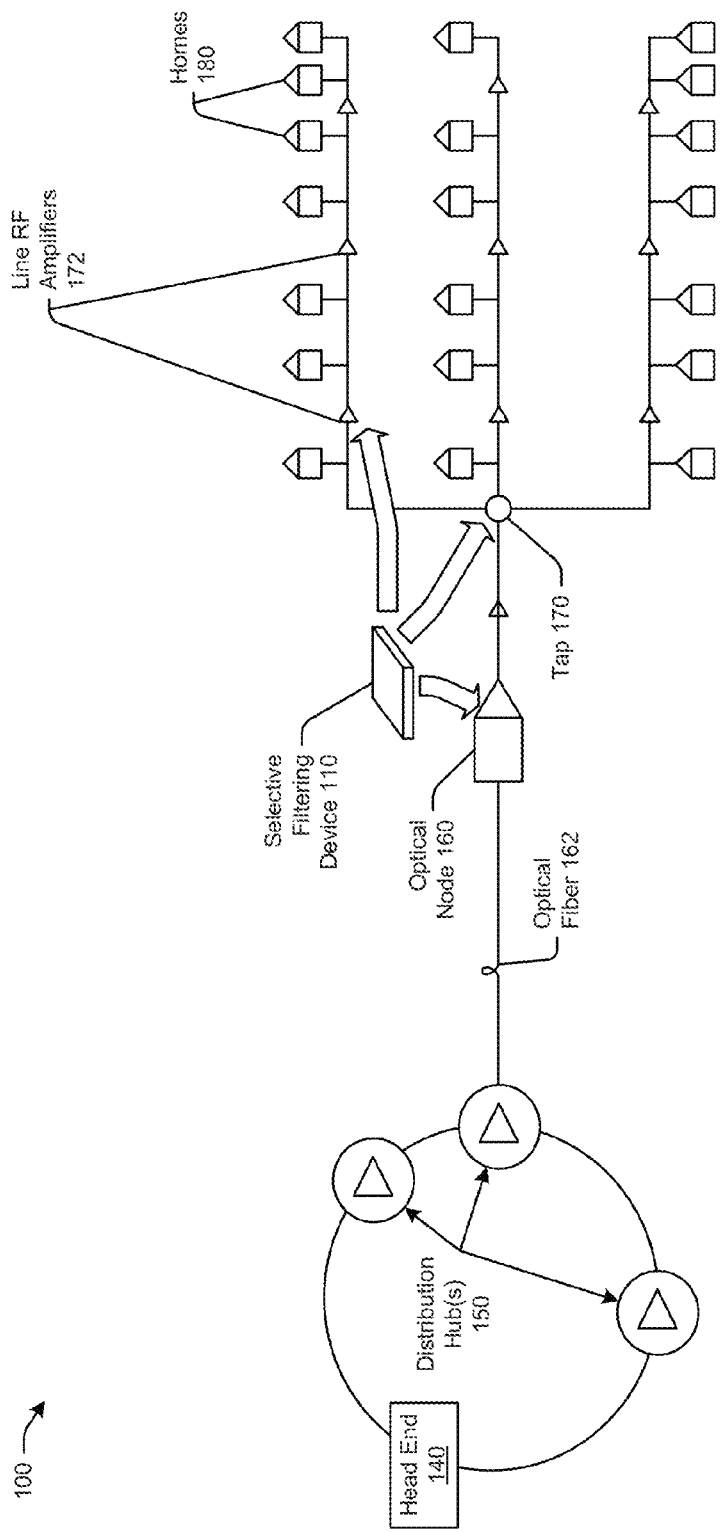
FIG. 1 illustrates an example hybrid fiber and coaxial cable network in which a selective filtering device may be placed at various locations, according to an embodiment of the disclosure.

FIG. 1 depicts an example hybrid fiber and coaxial (HFC) network 100 in which a selective filtering device 110 may be placed at various locations, according to an embodiment of the disclosure. The example HFC network 100 may include, but is not limited to, a head end device 140, one or more distribution hubs 150, an optical node 160, amplifiers 172 and homes or customer premises 180. Optical fiber 162 may connect one or more of the distribution hubs 150 to the optical node 160. Coaxial cable may connect the tap 170 and/or other portions of the HFC network 100 to the customer premises 180, in one embodiment. The HFC network 100 may also include a service provider network, as described in greater detail below.

A selective filtering device 110 may be located at various locations in the HFC network 100, such as within, coupled to, adjacent to, proximate to, in communication with, etc., a tap 170, an optical node 160, or an amplifier 172, as shown via the arrows extending from the selective filtering device 110. For example, in example embodiments, the selective filtering device 110 may be located at the tap 170. The selective filtering device 110 may be located at any portion in the service provider network 100, via one or more wired or wireless connections, to facilitate reducing signal impairments using the selective filtering techniques described herein.

The selective filtering device 110 may have one or more inputs that allow it to receive a cable (e.g., optical cable, coaxial cable, or other connection whether wired or wireless) in the service provider network. The selective filtering device 110 may receive signals (e.g., radio frequency (RF) signals) transmitted over the service provider network 100 via such inputs, in one embodiment. The selective filtering device 110 may also have one or more outputs (having similar connections to the inputs, in one embodiment) that may allow it to output signals on a cable in the service provider network. The selective filtering device 110 may also include one or more antennas and radios that may enable it to send and receive wireless transmissions. Although the disclosure may make reference to RF signals, it will be appreciated that the embodiments discussed may pertain to any suitable signal including RF signals and/or non-RF signals.

The head end device 140 may manage communications over the HFC network 100. For example, the head end device 140 may send content to the customer premises 180, which may include one or more user devices for receiving, buffering, decoding, and/or presenting the content. Example content may include video, audio, multimedia, text, data, or other information. The head end device 140 may also schedule communications received from user devices at customer premises. In one embodiment, the head end device 140 may send a Media Access Control (MAC) management message, a map message, or other communication to the user devices that indicates, among other information, a time and a frequency at which the user devices may transmit information upstream to the head end device 140. In this way, each user device may transmit information at a unique time and frequency over the HFC network 100. The information may be transmitted according to the Slotted ALOHA protocol, in one embodiment. The head end device 140 may also receive requests from the user devices to transmit information. Numerous other functions may be performed by the head end device 140 to facilitate the processes described herein. In one implementation, the head end device 140 may be located in a cloud computing arrangement and may provide all or at least a portion of the functions described above in association with the head end device 140.

As described, user devices at the customer premises 180 may send information to the head end device 140. As shown, the head end device 140 may be located relatively far away from the customer premises 180. Noise, interference, or other unwanted information associated with signals received from multiple customer premises 180 may be accumulated at locations further upstream in the HFC network 100. Noise, as used herein, may refer to distortions and/or spurious features in a signal that impair, reduce the robustness, and/or otherwise make it more difficult to extract information carried by a signal. For example, signals that include data and noise received from user devices at the customer premises 180 may be accumulated at the tap 170, as a non-limiting example. Similarly, signals that include data and noise received from user devices from other customer premises may be accumulated at another tap (not shown). The signals collected by both the tap 170 and the other tap (not shown) may be further accumulated or aggregated at the optical node 160, which is located further upstream (e.g., closer to the head end device 140) as shown. The amplifiers 172 may amplify signals received from the customer premises 180, as well as other customer premises, thereby further magnifying at least the noise in the signals.

In certain embodiments herein, a selective filtering device 110 located at the tap 170 may block, suppress, or restrict at least a portion of the noise such that the portion of the signal carrying the data from the user device may be sent further upstream to the head end device 140, as will be described in greater detail below. Such a selective filtering device 110 may also, or as an alternative, be located at an amplifier 172, the optical node 160, or various other locations in the HFC network 100. In this way, the selective filtering device 110 may be placed at strategic locations in the HFC network 100 to facilitate blocking noise. For example, the selective filtering device 110 may be assigned to a certain number of customer premises (e.g., thirty-two, twenty, etc.), and therefore, may identify signals corresponding to the particular customer premises. In this way, noise in the HFC network 100 may be isolated (e.g., to determine problems in the HFC network 100) using the relationship or association between the selective filtering device 110 and the customer premises 180.

The distribution hubs 150 may be connected to one or more optical fibers 162, which may carry signals to the optical node 160. The optical node 160 may be located in a local community that includes at least a portion of the customer premises 180. The tap or terminator 170 may form an access point from which one or more user locations, such as the customer premises 180, may be provided with broadband services, for example, via cable lines shown connecting the customer premises 180 to the tap 170, in one embodiment. In this way, the tap 170 may allow a cable line to be shared among multiple customer premises 180, or put another way, may feed multiple cable lines to respective customer premises 180. An example tap may include a 14-tap, or a tap 170 from which 14 cables lines are used to feed respective customer premises 180. Any type of tap from which any number of cables may extend or be connected to the tap may exist in other examples.

The customer premises 180 may include various devices and components to facilitate receiving and converting signals for use by user devices at the customer premises 180. Example devices may include, but are not limited to, a gateway, a physical layer, an optical network terminal (ONT), a media converter, etc. The gateway device may, for example, receive signals, demodulate the signal to obtain information in the signals, and distribute the information to user devices at the customer premises 180 over one or more networks, such as a wireless fidelity (WiFi) network, a Multimedia over Coax Alliance ("MoCA") network, etc.

The signals (e.g., broadband signals) transmitted over the service provider network 100 may be communicated according to various formats or standards such as, but not limited to, Data Over Cable Service Interface Specification (DOCSIS), Quadrature Amplitude Modulation (QAM), Passive Optical Network (PON), Ethernet Passive Optical Network (EPON), Orthogonal Frequency Division Multiplexing (OFDM), Multimedia over Coax Alliance ("MoCA"), or other communication standards for wired or wireless communications supported by devices and components in the service provider network 100.

The above descriptions in FIG. 1 are for purposes of illustration and are not meant to be limiting. Other descriptions, examples, embodiments, etc., may also exist. For example, networks other than an HFC network 100 may exist in other implementations. Also, although a certain number of devices or components are shown, fewer or more of each of these devices or components may exist in other embodiments. The user devices at the customer premises may include one or more set-top boxes, televisions, cable modems, mobile devices, etc., or other devices that may facilitate receiving and presenting content received from the head end 140.

Figure 2:
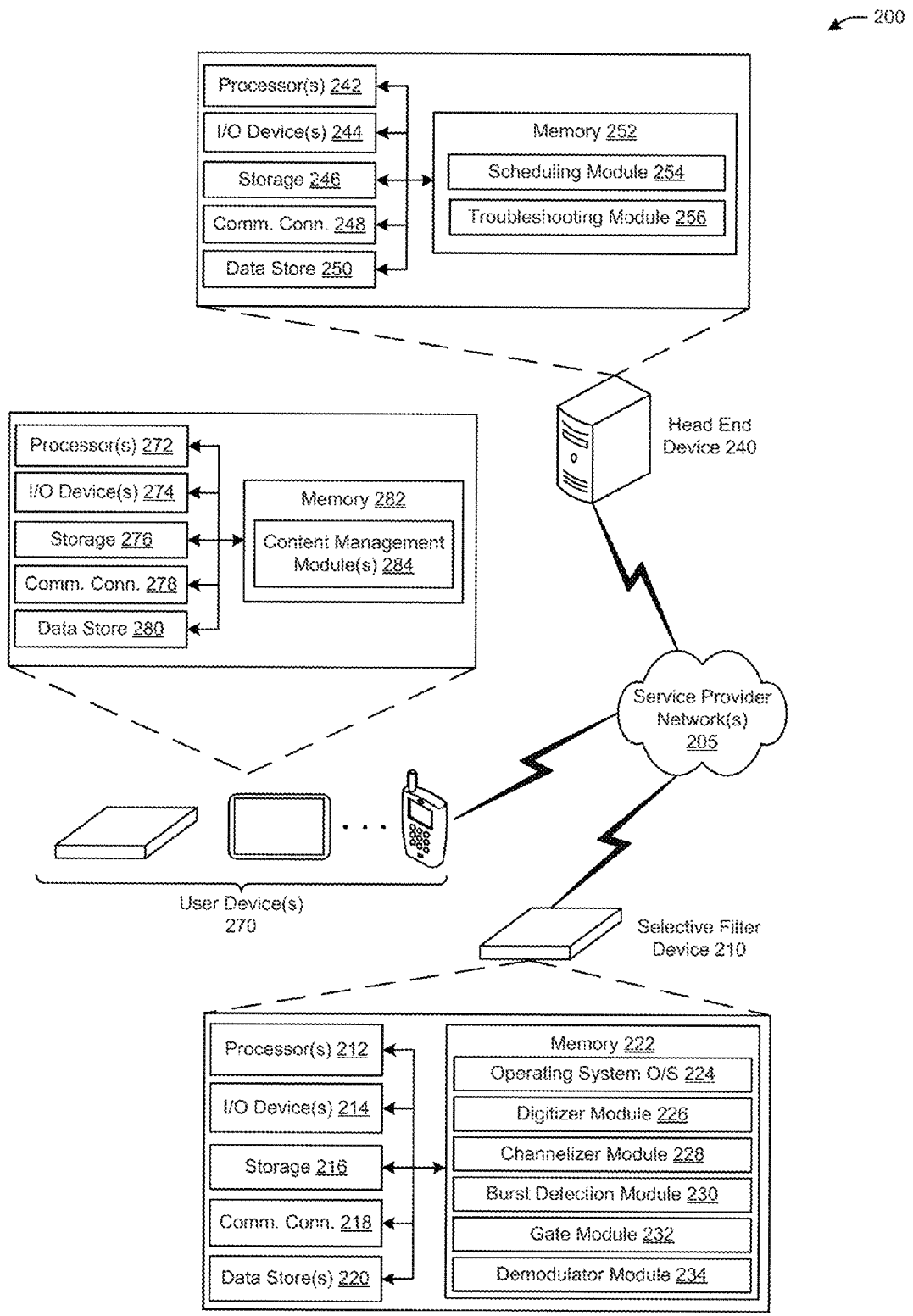
FIG. 2 illustrates an example computing environment for implementing selective filtering techniques to reduce signal impairments in communications networks, according to an embodiment of the disclosure.

FIG. 2 depicts an example computing environment 200 for implementing selective filtering techniques to reduce signal impairments in communications networks, according to an embodiment of the disclosure. The example computing environment 200 may include, but is not limited to, a selective filtering device 210, a head end device 240, and a user device 270. These devices may communicate with one another over a service provider network 205, which may include a hybrid fiber network 100 in FIG. 1, or various other networks. Example networks may include, but are not limited to, cable networks, optical networks, hybrid fiber coaxial (HFC) networks, Passive Optical Networks (PON) (e.g., Ethernet PON or EPON, Gigabit PON or GEPON), secure PON or SPON), active optical networks (AON), digital subscriber line (DSL) networks, other landline-based networks, wireless networks, or any combination of these and/or other networks.

The head end device 240 may be embodied by the head end device 140 in FIG. 1, and the selective filtering device 210 may be embodied by the selective filtering device 110 in FIG. 1, in one embodiment. The user devices 270 may be located at a customer premise, such as the customer premises 180 in FIG. 1.

Example communication may include the head end device 240 sending information, such as a MAC management message indicating a time and frequency at which a certain device may send communications upstream to the head end device 240), content, and/or other information, to the selective filtering device 210. The selective filtering device 210 may send at least a portion of the information to one or more of the user devices 270. For example, the selective filtering device 210 may send a MAC management message to a user device 270 that configures the user device 270 to send upstream information at a certain time and frequency. The selective filtering device 210 may also receive signals from the user devices 270. The selective filtering device 210 may block noise (e.g., at least a portion of noise) in the received signals and permit information or data in the signal (e.g., non-noise information) to be sent upstream to the head end device 240, as will be described in greater detail below. Although the disclosure herein refer to the filtering being performed and improved information or data being sent in an upstream direction, it will be appreciated the systems, apparatus, computer-readable media, and/or apparatus disclosed herein may be applied to bi-directional information or data filtering and/or enhancement.

As used herein, the term "device" may refer to any computing component that includes one or more processors that can be configured to execute computer-readable, computer-implemented, or computer-executable instructions. Example devices may include server farms, servers, personal computers, televisions, set-top boxes, modems (e.g., cable modems), other customer premise equipment, kiosks, smart phones, digital assistants, tablets, wearable devices, Internet appliances, application-specific circuits, microcontrollers, minicomputers, transceivers, or other processor-based devices. The execution of suitable computer-implemented instructions by one or more processors associated with various devices may form special purpose computers or other particular machines that may implement the processes described herein.

In one embodiment, the selective filtering device 210 may include one or more processors configured to communicate with one or more memory devices and various other components or devices. In an example embodiment, the selective filtering device 210 may include one or more processors 212, and in some implementations, one or more input/output (I/O) devices 214, storage 216, one or more communication connections 218, and one or more data stores 220. In other embodiments, such as that in FIG. 3, additional devices or components may be used to implement selective filtering techniques as described herein.

The one or more processors 212 may be implemented as appropriate in hardware, software, firmware, or a combination thereof. The one or more processors 242 and 272 of the head end device 240 and the user device 270, respectively, may be the same or at least similar to the processor 212.

The memory 222 may store program instructions that are loadable and executable on the processor 212, as well as data generated during the execution of these programs. Depending on the configuration and type of the selective filtering device 210, the memory 222 may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc. The memories 252 and 282 of the head end device 240 and the user device 270, respectively, may be the same or at least similar to the memory 222.

The memories 222, 252, and 282, and the storage 216, 246, and 276, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The I/O devices 214 may enable a user to interact with the selective filtering device 210 to perform various functions. The I/O devices 214 may include, but are not limited to, a keyboard, a mouse, a pen, a voice input device, a touch input device, a gesture detection or capture device, a display, a camera or an imaging device, speakers, and/or a printer. The I/O devices 244 and 274 of the head end device 240 and the user device 270, respectively, may be the same or at least similar to the I/O devices 214.

The communication connections 218 may allow the selective filtering device 210 to communicate with other devices, such as the head end device 240 and the user devices 270 over the one or more service provider networks 205. In one implementation, the communication connections 218 may include one or more line cards, which may include modular circuits on a printed circuit board or other configurations. The line cards may interface with the service provider network 205 to enable the selective filtering device 210 to send and/or receive information from the head end device 240 and the user devices 270. The communication connections 248 and 278 of the head end device 240 and the user device 270, respectively, may be the same or at least similar to the communication connections 218.

The one or more data stores 220 may store lists, arrays, databases, flat files, etc., that include information used to facilitate the processes described herein. In some implementations, the data store 220 may be stored in a memory external to the selective filtering device 210 but may be accessible via one or more networks. Example information stored in the data stores 220 may include information associated with MAC management messages, which may include identifications of user devices, times at which the user devices may transmit information upstream to the head end device 240, and one or more frequencies at which the user device may transmit the information.

Turning to the contents of the memory 222, the memory 222 may include, but is not limited to, an operating system (O/S) 224, a digitizer module 226, a channelizer module 228, a burst detection module 230, a gate module 232, and a demodulator module 234. Each of these computer program modules may be implemented as individual modules that provide specific functionality associated with optimizing video coding efficiency. As an alternative, one or more of these modules may perform all or at least a portion of the functionality associated with the other modules. As another alternative, the functions provided by the modules may be implemented by one or more devices or components, such as those in FIG. 3 described in greater detail below.

The O/S 224 may be any suitable application, module, firmware, etc., that controls the general operation of the selective filtering device 210. The O/S 224 may also facilitate the execution of other software modules, for example, the modules shown in the memory 222, in one implementation.

The digitizer module 226 may digitize an analog signal to generate digital signals representing the analog signal, in one embodiment. Such an analog signal may include carriers as well as noise. A carrier may refer to a waveform (e.g., sinusoidal) that is modulated or modified within an input signal for the purpose of conveying information. A carrier may therefore include information sent by the user devices 270 over the service provider network 205. Such a carrier may also be referred to herein as a valid carrier to signify that the carrier includes information, data, or other content distinguishable from noise, which may also exist in a signal. Noise may ingress into a signal due to various sources of interference. For example, noise may be undesired signals that may ingress into a communication link (e.g., two way radio communication, other interference, etc.) from a surrounding environment. Valid carriers may be filtered so that at least a portion of noise may be removed from the signal such that one or more valid carriers may be to pass further upstream toward the head end device 240.

The channelizer module 228 may partition digitized data into separate frequency slots (e.g., 1.0 MHz, 2.0 MHz, etc.). For example, a signal that ranges from 1.0 MHz to 20.0 MHz may be divided into twenty (20) 1.0 MHz slots (e.g., 20×1.0 MHz=20 MHz). By partitioning the channels in such fashion, the burst detection module 230, as will be described in greater detail below, may compare power densities of portions of the signal at each slot to a threshold value to determine whether the portion of the signal is a valid carrier or noise. Some embodiments may involve detecting bursts or valid carriers without partitioning a signal into slots as described above. It will be appreciated that in some example embodiments, the channels may be of varying width and may overlap.

The burst detection module 230 may detect bursts in the signal. The bursts may be portions of the signal that have a greater power spectral density or energy than other portions of the signal. In one embodiment, the burst detection module 230 may analyze an entire signal to detect bursts. As described above, a signal may be divided into slots by the digitizer module 226, in one embodiment. The burst detection module 230 may compare portions of the signal at each slot to determine whether the portion of the signal is valid. A portion of the signal having a power density that exceeds a threshold may be determined to be a valid carrier, while portions of the signal that are less than or equal to the threshold value may be determined to be noise. The valid carriers may be maintained or allowed to pass upstream while the noise may be blocked from passing upstream.

The threshold used in a comparison to determine whether a portion of a signal is a valid carrier may be predetermined. In one embodiment, such a threshold may be established by a user. In another embodiment, the threshold may be based on a hysteresis or historical information indicative of typical power densities for a carrier. For example, the burst detection module 230 may identify a repeated power density that occurs at one or more frequencies (e.g., a frequency slot) at a certain time of day, day of week, etc. The repeated power densities may be averaged over time to determine a suitable threshold to be used in the comparison. For example, power densities greater than 80.0%, or any percentage or value, may be determined to be valid. Techniques other than averaging historical power densities may be used in other examples. In other embodiments, a threshold may be determined based on a noise floor or level, as will be described in greater detail below. Portions of a signal that are greater than a noise floor or level may be determined to be valid carriers. As will be described, a hysteresis or historical information associated with noise levels may be used to determine such a threshold in various embodiments herein. Any number of other techniques or approaches may be used to determine a threshold value to facilitate determining whether a portion of a signal is a valid carrier or noise, in other examples. In additional example embodiments, there may be a maximum threshold power level and power values of signals greater than the maximum threshold power level may be noise and, as a result filtered and/or otherwise removed.

In certain embodiments herein, the burst detection module 230 may be configured to identify bursts at one or more predetermined frequencies. The predetermined frequencies may be any value, for example, that may be established by a user, in one embodiment. In another embodiment, the predetermined frequency ranges may be determined based on a hysteresis or historical communications that are monitored and stored over time. The historical communications may indicate valid carriers that recur at certain frequencies in a signal over time (e.g., at a certain time of day, time of month, in association with certain network activity, or other occurrences in the network). For example, valid carriers may be identified in a signal at frequencies of 20.0 MHz to 22.0 MHz at 1:30 PM on Monday through Friday. Such carriers may be associated with scheduled transmissions received from a user device 270 at a customer premise location. In this example, the burst detection module 230 may determine that a valid carrier exists at frequencies of 20.0 MHz to 22.0 MHz at least at 1:30 PM on Monday through Friday. The burst detection module 230 may, in the present example, determine that portions of the signal outside of the 20.0 MHz to 22.0 MHZ range may be noise, and thus, may ignore the noise portions, in one embodiment. Other techniques for identifying predetermined frequencies at which valid carriers exist may also be used in other examples.

The burst detection module 230 may perform digital subtraction to cancel at least a portion of noise from carriers in a signal. In so doing, the burst detection module 230 may capture noise on a channel at a point in time before carriers are sent on the channel. The burst detection module 230 may also capture a signal on the channel at a point in time when carriers are transmitted over the channel. Such a signal may include bursts and noise. In one embodiment, digital subtraction may include subtracting the signal that includes the bursts and noise from the signal that includes the noise before the carriers were transmitted. Such subtraction may arrive at a signal that includes the valid carriers and residual noise resulting from subtracting the noise captured at both points in time. In one embodiment, to facilitate digital subtraction, the digitizer module 226 may digitize an analog signal such that the analog signal may be represented in a digital format that includes ones and zeroes.

In one embodiment, a signal may include embedded information that may indicate frequencies at which carriers are located. The burst detection module 230 may identify such embedded information and may further identify the carriers in the signal based at least in part on the embedded information. In this way, carriers may be learned based on information in the signal. In one embodiment, the embedded information may be communicated in a Data Over Cable Service interface Specification (DOCSIS) Upstream Channel Descriptor (UCD) message. The UCD message may include information that may be used to manage communications between the head end device 240 and the user device 270. In one embodiment, the UCD message may be broadcasted from the head end device 240 to the user devices 270.

The burst detection module 230 may also filter a signal according to a MAC management message received from the head end device 240, in one embodiment. The MAC management message may indicate the time and frequency at which a user device 270 may send information upstream to the head end device 240. The burst detection module 230 may identify carriers at such frequencies in signals received by the selective filtering device 210, and may suppress, block, or otherwise ignore frequencies not specified in the MAC management message at the indicated time. Such operation performed by the burst detection module 230 may be referred to herein as opening the channel at certain frequencies such that carriers at these frequencies may pass upstream, while portions of the signal at other frequencies may be blocked or not allowed to pass. In some embodiments, carriers identified at predetermined frequencies may be verified to ensure that they are valid carriers. For example, the power densities of the carriers may be compared to one or more threshold values, as described above, to verify whether they are valid carriers, in one embodiment.

At least a portion of communications received from the user devices 270 may be requests to transmit information. The burst detection module 230 may configure the selective filtering device 210 to open all frequency channels for transmission requests signals from the user devices 270. In such instances, the burst detection module 230 may analyze the power density or level of carriers in the transmission request signal to determine whether the carriers are valid, and therefore, should be forwarded upstream to the head end device 210, or whether the carriers are noise, and therefore, should be filtered out or blocked from moving upstream.

The gate module 232 may open certain frequencies in a signal to allow carriers at the opened frequencies to be captured and passed upstream while blocking or muting noise at other frequencies. The captured carriers may be carriers carrying valid data, and therefore, may be allowed to move upstream in the service provider network 205. The blocked carriers may be noise, and therefore, may be prevented from moving upstream in the service provider network 205. In this way, the gate module 232 may eliminate or reduce noise in a signal. The gate module 232 may also receive instructions from other modules, devices, or components that include information identifying frequencies at which carriers are to be preserved or captured, among other information.

The demodulator module 234 may remove all or at least a portion of noise from a signal by demodulating the signal to the original digital signal, and modulating the output of the demodulated signal (e.g., the original digital signal without noise). The demodulator module 234 may also receive a MAC management message and identify scheduled times and frequencies for transmission by user devices 270 in the MAC management message. The demodulator module 234 may also receive upstream communications from the user devices 270, and may cause the gate module 232 to open indicated frequencies at the scheduled time to enable valid carriers at these frequencies to be captured, while information at other frequencies may be blocked or muted. In example embodiments, device may be configured to integrate multiple MAC messages together to understand when to open and/or close based at least in part on the user devices 270 that may be located further downstream in the network.

The selective filtering techniques described above may be used to determine valid carriers in signals from multiple customer premise locations. Such signals may include an accumulation of data and noise from multiple customer premise locations in the service provider network. As described, data and noise in the signals may be additive such that as more user devices send information over the service provider network 205, associated data and noise may be added to the signal the further upstream the signals travel. In certain embodiments herein, the selective filtering device 210 may be placed at certain locations in the service provider network upstream of the user devices 270 to facilitate identifying valid carriers in signals that include such accumulated or additive data and noise.

The head end device 240 may communicate with the selective filtering device 210 to facilitate reducing signal impairments using selective filtering techniques, as described herein. The head end device 240 may include a memory 252 that includes a scheduling module 254 and a troubleshooting module 256, as shown. The scheduling module 254 may send MAC management messages to the selective filtering device 210. The MAC management messages may indicate a respective time and frequency at which user devices at customer premise locations may send upstream information, among other information. The selective filtering device 210 may utilize the MAC management messages to open certain channel frequencies based on the expected time of transmission by a user device indicated in the MAC management message, as described above.

The troubleshooting module 256 may perform functions related to troubleshooting problems in the service provider network 205. In so doing, the troubleshooting module 256 may receive (e.g., from the selective filtering device 210) metrics or information associated with the performance of the service provider network 205. Such information may include variations in noise experienced in the network over time, as described in greater detail below.

The troubleshooting module 256 may also analyze the received information to determine whether a problem exists in the service provider network 205. For example, the troubleshooting module 256 may identify repeated noise peaks in the received information, and may determine that such noise peaks indicate that a problem exists at one or more nodes or customer premises in the service provider network associated with the selective filtering device 210 from which the metrics were received. In one embodiment, the burst detection module 230 of the selective filtering device 210 may analyze the noise variations and provide results to the head end device 240 (e.g., whether a problem may exist in the service provider network 205 based on the analysis).

The troubleshooting module 256 may also send an instruction to the selective filtering device 210 that causes the selective filtering device 210 to turn off or power down such that the selective filtering device 210 may no longer receive signals from downstream user devices at customer premises and forward information in the signals further upstream. Put another way, the instruction may cause the selective filtering device 210 to no longer output signals upstream in the service provider network 205. In this way, the troubleshooting module 256 may isolate problems in the service provider network 205. The troubleshooting module 256 may also send an instruction to the selective filtering device 210 that causes the selective filtering device 210 to power on or resume outputting signals upstream in the service provider network 205. In alternative example embodiments, the troubleshooting module 256 may be configured to monitor MAC messages and identify user devices 270 that transmit at times without a corresponding MAC message.

The user devices 270 may include the memory 282, which may include content management modules 284. The content management module 284 may configure the user devices 270 to, among other functions, receive, output, and send various information including, but not limited to, requests to transmit information, content, data, etc. The information may be sent upstream to a selective filtering device 210, within a customer premise location at which the user devices 270 are located, or to other devices. Example user devices 270 may include set-top boxes, televisions, cable modems, mobile devices, etc., or other devices that may facilitate receiving and outputting content.

The above descriptions in FIG. 2 are for purposes of illustration and are not meant to be limiting. Other devices, as well as the communication between the devices, may exist in other examples.

Figure 3:
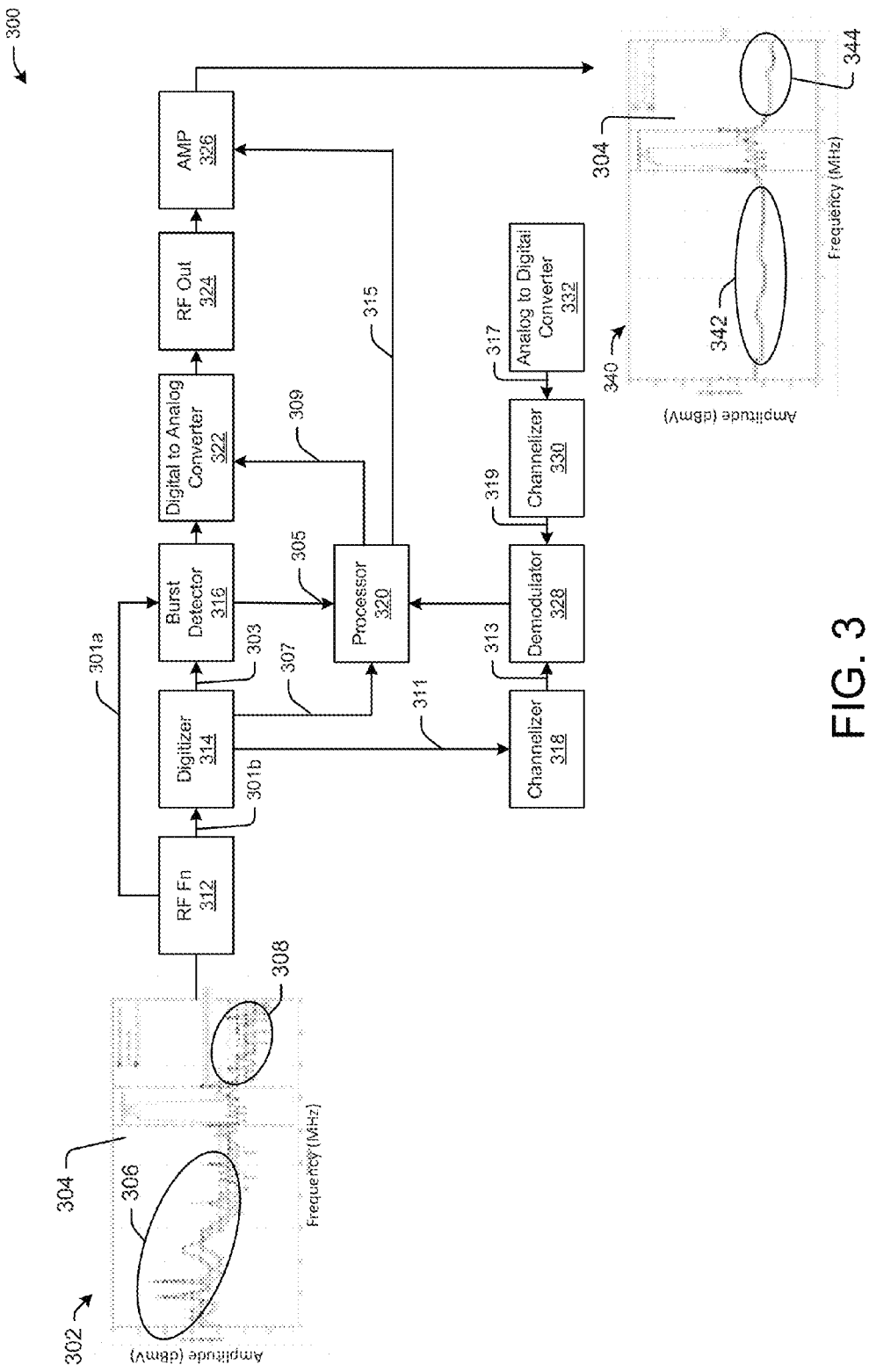
FIG. 3 illustrates components in a device configured to implement selective filtering to reduce signal impairments, according to an embodiment of the disclosure.

FIG. 3 depicts components in a device 300 configured to implement selective filtering to reduce signal impairments, according to an embodiment of the disclosure. The device 300 may be a selective filtering device, such as the selective filtering device 210 in FIG. 1. The selective filtering device 300 may receive an input signal 302 and process the signal according to the techniques described herein to generate the output signal 310.

Devices or components in the selective filtering device 300 may include, but are not limited to, an RF input connector 312, a digitizer 314, a burst detector 316, a channelizer 318, a processor 320, a digital-to-analog converter 322, an RF output connector 324, and an amplifier 326. Although one of these devices are shown, more may exist in other implementations. Also, all or at least a portion of the functions performed by one of the components may be performed by at least one other component. Also, all or at least a portion of the components in the selective filtering device 300 may perform the same or similar functions performed by the modules in the memory 222 of the selective filtering device 210, in one implementation.

The signal 302 may be received from a user device (e.g., the user device 270 in FIG. 2) at a customer premise location. The signal 302 may include carriers and noise. In the present example, a carrier may be represented by the one or more carriers 304. The carriers 304 may carry valid information sent from the user device, for example, to the head end device (e.g., the head end device 240) or another device or component in a service provider network (e.g., the service provider network 205 in FIG. 2). The signal 302 may also include noise, interference, or other unwanted information. For example, portions 342 and 344 on either side of the carrier 304 may be noise. Such noise portions 342 and 344 may be blocked or suppressed, while the carrier 304 may be preserved and output as the signal 340 shown in FIG. 3. The signal 340 illustrates the eliminated or reduced noise portions 342 and 344, along with the carrier 304.

The selective filtering device 300 may use various techniques to filter the signal 302 to eliminate or reduce the noise in the signal 302. One technique may include detecting the energy or power density observed in the signal 302 to determine valid carriers. Another technique may include using predetermined channels or frequencies in the signal 302 to determine valid carriers. Another technique may include digitizing the signal 302 and performing digital subtraction to determine the valid carriers among noise in the signal. Yet another technique may include demodulating the signal 302 and using a MAC management message that indicates particular times at which user devices are authorized to transmit information upstream. Examples of these techniques are provided below.

The selective filtering technique that involves detecting the power level may be as follows. The signal 302 received by the RF input 312 may be processed by a burst detector 316. The burst detector 316 may receive the signal 302 from the RF input 312, as shown via line 301a. The burst detector 316 may identify the burst 304 in the signal 302. In one embodiment, the burst detector 316 may identify the carrier or burst 304 by comparing the power density of the burst 304 (e.g., approximately 6.0 dBmV) to a threshold level. If the power density of the burst 304 exceeds the threshold level, then the burst detector 316 may determine that the burst 304 is a valid carrier. If the burst 304 does not exceed the threshold value, then the burst 304 may be determined to be noise (e.g., a noise spike).

The burst detector 316 may send a message (as shown in line 305) to the processor 320. The message may include an indication that a burst was identified in the signal 302. The processor 320 may identify the frequencies or frequency range of the burst 304 (e.g., approximately 35.0 MHz to 40.0 MHz in the present example), and may determine whether the burst is representative of a valid carrier containing valid data. In one embodiment, the processor 320 may compare the power density of the burst 304 to a noise floor, and may determine that the burst 304 is a valid carrier if the power level of the burst 304 exceeds the power level of the noise floor, as described in greater detail below. In so doing, the processor 320 may determine that portions 342 and 344 of the signal 302 are noise. In another embodiment, the processor 320 may use a hysteresis or historical information to determine whether the burst 304 is indicative of a valid carrier that has been historically received at a certain (e.g., predetermined) frequency. The processor 320 may use other techniques to determine valid carriers in other examples.

The processor 320 may send a message to the digital-to-analog converter 322, as shown in line 309. The message may include one or more frequencies or frequency ranges associated with the valid carrier, as well as an instruction that causes the digital-to-analog converter 322 to open frequencies corresponding to the frequencies over which the valid carrier was detected. The digital-to-analog converter 322 may open such frequencies, or put another way, may allow the valid carriers to continue to the RF output 324, while blocking or muting other portions of the signal 302, such as the identified noise portions 306 and 308.

Another selective filtering technique may include using predetermined frequencies. According to this technique, the burst detector 316 may receive the signal 302 from the RF input 312, as shown by line 301a. The burst detector 316 may determine whether a burst exists in the signal 302 by comparing power densities of carriers in the signal 302 to threshold power densities, as described above. In the present example, the burst detector 316 may identify the burst 304.

The burst detector 316 may send an indication that the burst 304 was identified in the signal 302. The processor 320 may use predetermined channels or frequencies to determine whether valid carriers exist at these frequencies. For example, the processor 320 may access information that indicates that valid carriers should be between frequencies 38.0 MHz and 40.0 MHz, as shown in the above example. The processor 320 may compare the carriers at such frequencies to determine whether they exceed a threshold level (e.g., the noise floor), and if so, may determine that the carriers at the predetermined frequencies are valid carriers, and may send an instruction to the digital-to-analog converter 322 to open the predetermined frequencies such that the valid portion of the signal 302 (e.g., the burst 304) may be permitted to continue to the RF output 324 for distribution to a head end device, while other portions of the signal 302 (e.g., the noise portions 306 and 308) may be suppressed or blocked from continuing to the RF output 324.

In some implementations, the RF input 312 may send the signal 302 to the processor 320 without first sending it to the burst detector 316. The processor 320 may still use predetermined channels to identify bursts in the signal 302, as described above, without bursts in the signal 302 being first detected by the burst detector 316.

Other selective filtering techniques may include digitizing the signal 302. According to one technique, the digitizer 314 may receive the signal 302 from the RF input 312, as shown by the line 301b. The digitizer 314 may digitize the signal 302 to generate a digital representation of the analog signal 302. Various sampling techniques may be used to generate the digital representation.

The burst detector 316 may receive the outputted digital signal from the digitizer 314, as shown by the arrow 303. The burst detector 316 may identify one or more bursts in the digitized signal. For example, the burst 304 represented by the one or more carriers in the signal 302 may be identified by the burst detector 316. As shown, a burst 304 may be detected in the frequency range of 35.0 MHz to 40.0 MHz. The burst detector 316 may determine that the burst 304 has a power density or amplitude of approximately −5.0 dBmV, while the noise has a power density of approximately −12.0 dBmV or lower, as shown by the noise portions 306 and 308 of the signal 302.

The burst detector 316 may send a message to the processor 320 (line 305) indicating that a burst was detected. The processor 320 may also receive a digital representation of the signal 302 from the digitizer 314, as shown by line 307.

The processor 320 may identify the bursts. In one embodiment, the processor 320 may identify the bursts by performing digital subtraction. For example, the processor 320 may subtract the power densities associated with bursts and noise at different points in time to cancel the noise and leave the valid carriers, in one embodiment. The processor 320 may further send an instruction to the gate 322 (as shown via line 309) to open the one or more frequencies associated with the valid carriers.

Another selective filtering technique may involve demodulating the signal 302. According to this technique, the signal 302 may be digitized by the digitizer 314. The digitized signal may be sent to the channelizer 318 (as shown by line 311), which may divide the digitized portions of the digitized signal 302 into slots (e.g., 1.0 MHz slots, 2.0 MHz slots, etc.). The channelized digitized signal may be sent to the demodulator 328, as shown by the line 313. Such processing may occur in conjunction with upstream communications received from user devices at customer premise locations. In one embodiment, the demodulator 328 may identify carriers at one or more predetermined frequencies to identify valid carriers, as described in greater detail below.

The demodulator 328 may receive a MAC management message that indicates, among other information, a time and a frequency over which user devices may transmit messages upstream in the service provider network. In one embodiment, the MAC management message may be received in the downstream direction from the head end device. The RF signal that includes the MAC management message may be digitized by the analog-to-digital converter 332 (as shown by line 317), and the digitized signal may be channelized by the channelizer 330 before being received by the demodulator 328, as shown by line 319.

The demodulator 328 may identify such times and frequencies in the MAC management message. The demodulator 328 may communicate the times and frequencies to the processor 320, which may send an instruction to the gate 322 that causes the gate to open the indicated frequencies at the indicated time. In this way, valid carriers or data expected from user devices may be permitted through the digital-to-analog converter 322, while other frequencies not indicated in the MAC management message at the indicated time may be blocked or not permitted through.

In one implementation, the demodulator 328 may include an upstream and a downstream demodulator. The downstream demodulator may receive a signal that includes a MAC management message and may identify the time and frequency for upstream communication for user devices in the MAC management message. The upstream demodulator may receive information at the scheduled time and frequency from the user devices, and may communicate the receipt of the message to the processor 320, which may cause the processor 320 to permit carriers on the frequency to move through at the indicated time. The processor 320 may also cause the pathway through the digital-to-analog converter 322 to remain open during requests to transmit received from user devices at customer premise locations.

Another selective filtering technique that may involve demodulating the signal 302 may be as follows. The signal 302 may be demodulated to the original signal (e.g., without noise) by the demodulator 328, and the output of the demodulation may be sent to the RF output 324 and modulated over the service provider network. All, or at least a portion, of the noise may be removed using such a technique.

In each of the selective filtering techniques described above, the digital-to-analog converter 322 may send the carriers for which frequencies were opened to the RF output 324, which may output the signal corresponding to the valid carriers to the amplifier 326 (as shown by line 315). The amplifier 326 may amplify the signal, which may travel upstream in the service provider network to the head end device or another device.

The above descriptions in FIG. 3 are for purposes of illustration and are not meant to be limiting. Other descriptions, examples, and embodiments may exist. For example, the example selective filtering device may include a different number and/or type of components, as well as different communication between such components.

Figure 4:
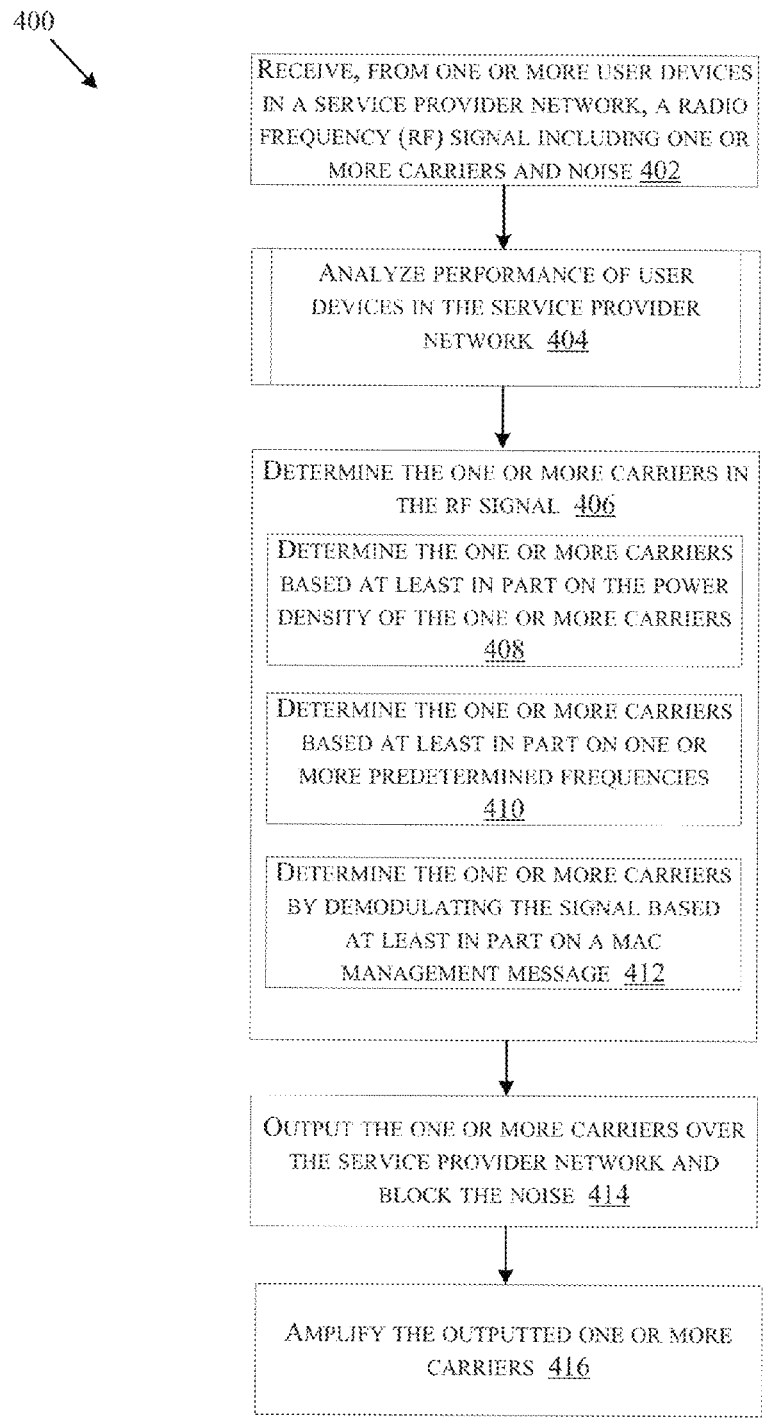
FIG. 4 illustrates a flow diagram of an example process for reducing signal impairments using selective filtering techniques, according to an embodiment of the disclosure.

FIG. 4 depicts a flow diagram of an example process 400 for reducing signal impairments using selective filtering techniques, according to an embodiment of the disclosure. The example process 400 may be implemented at least in part by a selective filtering device, such as the selective filtering device 300 in FIG. 3. The example process 400 may begin at block 402, where an RF signal from one or more user devices in a service provider network may be received (e.g., via the RF input 312). The RF signal may include one or more carriers and noise.

The performance of the one or more user devices in the service provider network may be analyzed at block 404. As will be described below in FIG. 5, such analysis may identify faulty devices or other problems in the service provider network. The presence of valid carriers in the RF signal may be determined using selective filtering techniques at block 406. Various selective filtering techniques may be implemented to determine the valid carriers.

For example, valid carriers may be determined based at least in part on observed power or energy densities of the carriers in the RF signal at block 408. The power densities of carriers may be compared to threshold values (e.g., by the burst detector 316) to identify the carriers. The identified carriers may be those carriers having a power density that exceeds a threshold value, as described above. Valid carriers may be identified and allowed to move upstream in the service provider network, while other, non-valid carriers (such as noise) may be blocked.

Another selective filtering technique for determining carriers may include identifying the carriers at predetermined frequencies in the RF signal at block 410. In one embodiment, carriers may be determined to exist at certain frequencies using historical communications. For example, carriers may be repeatedly observed to occur on the predetermined frequencies. For example, in a signal ranging from 0.0 MHz to 50.0 MHz, carriers may be observed to exist from frequency ranges 25.0 MHz to 28.0 MHz, although any values may exist in other examples. As described above, carriers at such predetermined frequencies may be identified and determined to be valid carriers. In some embodiments, the carriers at the predetermined frequencies may be compared to a threshold value to validate that the carriers are valid.

Another technique for determining carriers in the RF signal may include demodulating the RF signal at block 412. In one embodiment, a MAC management message may be received (e.g., by the demodulator 328). Times and frequencies at which user devices may communicate may be identified in the MAC management message. Carriers in the RF signal occurring at such times and frequencies may be determined to be valid carriers, as described above.

The valid carriers determined from any of the selective filtering techniques may be output for upstream distribution in the service provider network, while at least a portion of the noise in the RF signal may be blocked or not permitted to be output upstream, at block 414. The outputted carriers may be amplified at block 416.

Figure 5:
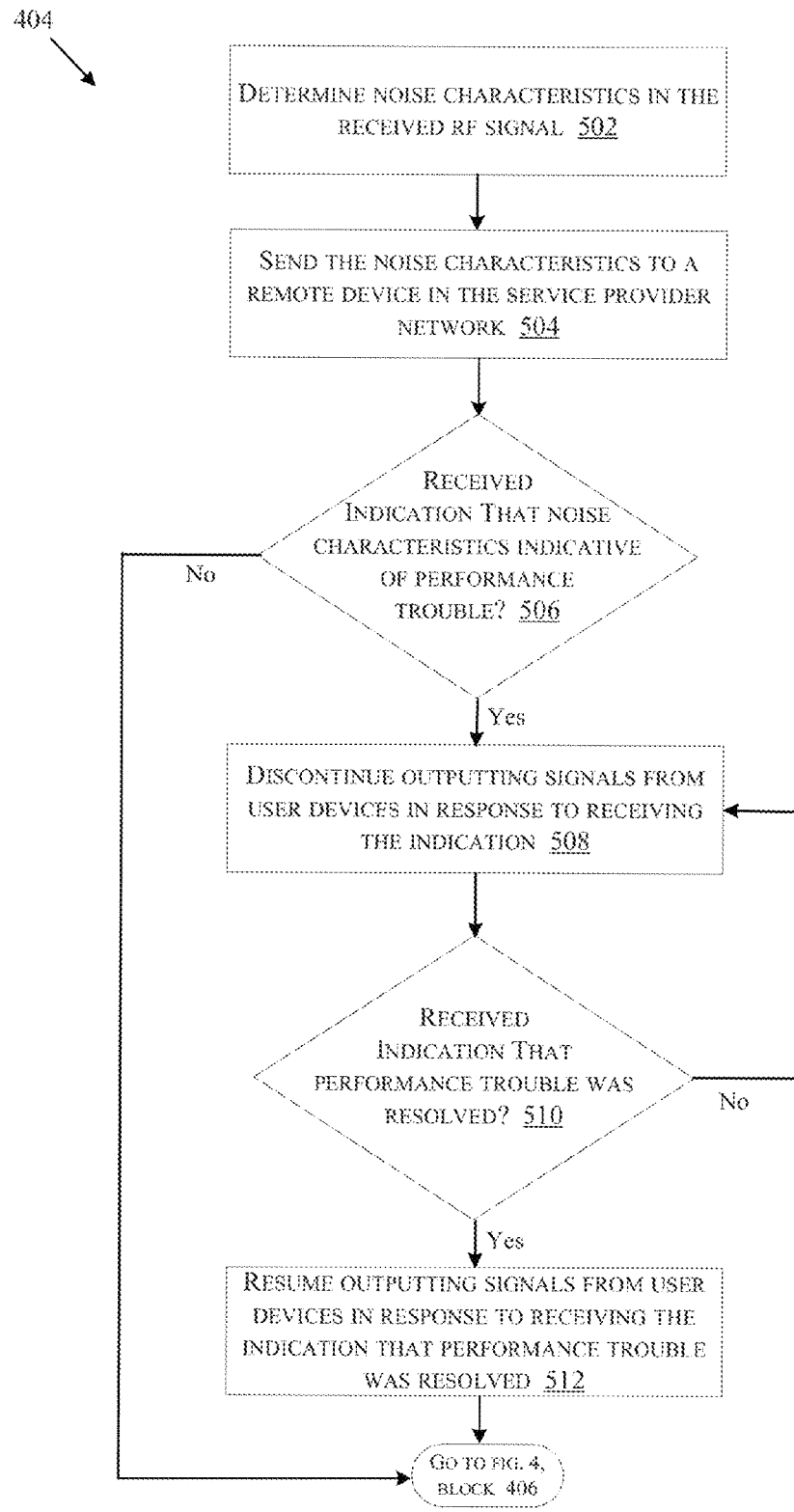
FIG. 5 illustrates a flow diagram of an example process for troubleshooting performance issues in a service provider network, according to an embodiment of the disclosure.

FIG. 5 depicts a flow diagram of an example process for troubleshooting performance issues in a service provider network, according to an embodiment of the disclosure. The processes in FIG. 5 may be performed at least in part by a selective filtering device.

At block 502, noise characteristics in the received RF signal may be determined. Noise characteristics may be determined by analyzing noise in current signals in view of an established noise level or floor. The noise floor may be a level above which valid carriers historically exist and below which noise historically exists. In one embodiment, the noise floor may be determined using a hysteresis or historical noise patterns. For example, power densities associated with historical noise over time may be analyzed to establish the noise floor based on an average of the noise power densities, the maximum noise power density, other mathematical techniques, etc.

The noise floor may be monitored and adjusted over time such that the noise level may be increased or decreased based on ongoing noise in monitored communications. In example embodiments herein, valid carriers above the noise level may have an energy or power level that ranges between approximately 33.0 decibels millivolt (dBmV) to 61.0 dBmV under DOCSIS 3.1. Such values may provide a substantial signal-to-noise ratio to facilitate identifying valid carriers above noise levels. Numerous other power levels for valid carriers may exist under the same or other standards.

Variations in the noise level or floor (as may be represented by multiple portions of a signal characterized as noise by virtue of such multiple portions having power densities that do not exceed a threshold value, or by virtue of various other determinations) over time as described above may be captured by the selective filtering device. Example variations in noise may include noise levels that increase above a noise floor, or noise levels that decrease above a noise floor. Noise that increases above an established noise floor may indicate a problem in the service provider network. For example, noise peaks may indicate that noise ingress, or more generally interference, is occurring at some point in the network downstream from the selective filtering device. In some examples, the noise peaks may have power levels that are higher than power levels of valid carriers, and therefore, may obfuscate valid data.

In one embodiment, noise characteristics may be sent to a remote device, such as a head end device (e.g., the head end device 240 in FIG. 2), at block 504. The noise characteristics may include variations in the noise, and may be used by the head end device to determine performance in the service provider network. For example, the head end device may determine whether the noise characteristics are indicative of performance trouble with user devices in the service provider network. The head end device may send results associated with the determination to the selective filtering device. The selective filtering device may receive the results at block 506. If the results indicate that the captured noise characteristics are indicative of performance trouble, then the selective filtering device may discontinue outputting signals from user devices, or may otherwise power down, at block 508. In one embodiment, the selective filtering device may, in response to receiving such a message from the head end device, adjust its gain. For example, the selective filtering device may increase the power gain to increase the power or amplitude of a received signal, or may reduce the power gain to reduce the power or amplitude of a received signal. In one example, the selective filtering device may reduce the power of a signal to a level such that the signal, including carriers and noise, may not be output or passed further upstream. In alternative example embodiments, the selective filtering device may determine that power is to be reduced (e.g., by reducing the power gain) based at least in part on identifying that a downstream user device 270 may be malfunctioning based on the user device 270 exceeding one or more respective threshold levels of power and/or frequency ranges.

In one embodiment, the selective filtering device may remain in the power off state until it receives a signal that the performance trouble was resolved (at block 510), or otherwise an indication that causes the selective filtering device to power on or resume outputting signals from user devices on the service provider network at block 512.

After causing the device to power down or no longer output signal from downstream user devices, the head end device may analyze signals received from other selective filtering devices (and hence other user devices) in the service provider network. Such signals may represent an aggregation or accumulation of multiple downstream signals associated with multiple user devices. The head end device may determine, based at least in part on the analysis, that a problem in the service provider network exists at a selective filtering device. For example, if variations in noise levels are removed when a particular selective filtering device is powered down, then the head end device may determine that the trouble is associated with the particular selective filtering device.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Further, although specific terms are employed herein, they are used in a generic and descriptive sense only and not for purposes of limitation.

What is claimed is:

1. A system comprising:
a service provider network, the service provider network comprising at least one of optical fiber or coaxial cable for carrying signals in the service provider network;
a device in the service provider network, the device located upstream of a plurality of user devices at customer premises, wherein the device comprises at least one processor that is configured to:
receive, from a user device of the plurality of user devices, a signal comprising one or more carriers and noise;
determine the one or more carriers in the signal based at least in part on at least a respective power density of the one or more carriers, the determining comprising:
comparing the respective power density of a first carrier to a threshold value; and
determining that the first carrier is valid when the respective power density of the first carrier exceeds the threshold value, wherein the threshold value is based at least in part on hysteresis or historical information indicative of a power density associated with the one or more carriers; and
output the one or more carriers in the signal for distribution over the service provider network and block at least a portion of the noise.

2. The system of claim 1, wherein the upstream location at which the device is located comprises at least one of an optical node, a tap, or an amplifier coupled to the device.

3. The system of claim 1, wherein the at least one processor configured to determine the one or more carriers comprises the at least one processor configured to:
receive a Media Access Control (MAC) management message;
determine, based at least in part on the MAC management message, one or more times and frequencies at which the user device is permitted to transmit information upstream; and
determine that the one or more carriers are valid if they are located at the one or more frequencies and are transmitted at the one or more times.

4. The system of claim 1, wherein the at least one processor is further configured to:
determine that at least a portion of the signal comprises the noise, wherein the determination is based at least in part on a comparison of power densities associated with the at least a portion of the noise to the threshold value; and block the noise from being output upstream in the service provider network based at least in part on the comparison.

5. The system of claim 1, wherein the at least one processor is further configured to:
   determine a noise level based at least in part on power densities of a plurality of historical signals;
   determine a variation in the noise level based at least in part on a comparison of noise in the signal to the noise level;
   send, to a remote device, an indication of the variation in the noise level; and
   receive, in response to sending the indication, an instruction that causes the device to no longer output signals upstream.

6. A device, the device located upstream of a plurality of user devices in a service provider network, the device comprising:
   at least one memory that stores computer-executable instructions; and
   at least one processor configured to access the at least one memory, wherein the at least one processor is configured to execute the computer-executable instructions to:
      receive, from a user device of the plurality of user devices, a signal comprising one or more carriers and noise;
      determine the one or more carriers in the signal based at least in part on at least one of a respective power density of the one or more carriers, the determining comprising:
         comparing the respective power density of a first carrier to a threshold value; and
         determining that the first carrier is valid when the respective power density of the first carrier exceeds the threshold value, wherein the threshold value is based at least in part on hysteresis or historical information indicative of a power density associated with the one or more carriers; and
      output the one or more carriers in the signal for distribution over the service provider network and block at least a portion of the noise.

7. The device of claim 6, wherein determining the one or more carriers configures the at least one processor to:
   receive a Media Access Control (MAC) management message;
   determine, based at least in part on the MAC management message, one or more times and frequencies at which the user device is permitted to transmit information upstream; and
   determine that the one or more carriers are valid if they are located at the one or more frequencies and are transmitted at the one or more times.

8. The device of claim 6, the at least one processor further configured to output the MAC management message to the user device.

9. The device of claim 6, wherein the at least one processor is further configured to:
   determine that at least a portion of the signal comprises the noise, wherein the determination is based at least in part on a comparison of power densities associated with the at least a portion of the noise to the threshold value; and
   block the noise from being output upstream in the service provider network based at least in part on the comparison.

10. The device of claim 6, wherein the at least one processor is further configured to:
    determine a noise level based at least in part on power densities of a plurality of historical signals;
    determine a variation in the noise level based at least in part on a comparison of noise in the signal to the noise level;
    send, to a remote device, an indication of the variation in the noise level; and
    receive, in response to sending the indication, an instruction that causes the device to no longer output signals upstream.

11. The device of claim 6, wherein the device is coupled to at least one of a tap, an optical node, or an amplifier.

12. The device of claim 6, wherein the service provider network is a hybrid fiber and cable (HFC) network.

13. A method, comprising:
    receiving, by a device comprising one or more processors and located upstream of a plurality of user devices in a service provider network, a signal comprising one or more carriers and noise, the signal received from a user device of a plurality of user devices;
    determining, by the device, one or more carriers in the signal based at least in part on at least one of a respective power density of the one or more carriers, the determining comprising:
       comparing the respective power density of a first carrier to a threshold value; and
       determining that the first carrier is valid when the respective power density of the first carrier exceeds the threshold value, wherein the threshold value is based at least in part on hysteresis or historical information indicative of a power density associated with the one or more carriers; and
    outputting, by the device, the one or more carriers in the signal for distribution over the service provider network and block at least a portion of the noise.

14. The method of claim 13, wherein determining the one or more carriers further comprises:
    receiving, by the device, a Media Access Control (MAC) management message;
    determining, by the device and based at least in part on the MAC management message, one or more times and frequencies at which the user device is permitted to transmit information upstream; and
    determining, by the device, that the one or more carriers are valid if they are located at the one or more frequencies and are transmitted at the one or more times.

15. The method of claim 13, further comprising:
    determining, by the device, that at least a portion of the signal comprises the noise, wherein the determination is based at least in part on a comparison of power densities associated with the at least a portion of noise to the threshold value; and
    blocking, by the device, the noise from being output upstream in the service provider network based at least in part on the comparison.

16. The method of claim 13, further comprising:
    determining, by the device, a noise level based at least in part on power densities of a plurality of historical signals;
    determining, by the device, a variation in the noise level based at least in part on a comparison of noise in the signal to the noise level;
    sending, by the device and to a remote device, an indication of the variation in the noise level; and receiving, by the device and in response to sending the indication, an instruction that causes the device to no longer output signals upstream.

\* \* \* \* \*